United States Patent [19]

Alberti

[11] 4,392,064
[45] Jul. 5, 1983

[54] UNBALLASTING RELAYS

[76] Inventor: Rosette Alberti, 7 rue Marie Bonaparte, 92 210, Saint-Cloud, France

[21] Appl. No.: 228,087

[22] Filed: Jan. 26, 1981

[30] Foreign Application Priority Data

Jan. 25, 1980 [FR] France ................. 80 01607

[51] Int. Cl.³ ............................................. H02J 13/00
[52] U.S. Cl. ....................................... 307/39; 307/35; 307/126
[58] Field of Search ................. 307/38, 39, 40, 35, 307/126, 130; 340/825.16, 825.18

[56] References Cited

U.S. PATENT DOCUMENTS

| 3,643,160 | 2/1972 | Ray et al. | 325/3 |
| 3,894,244 | 7/1975 | Hill | 307/16 |
| 4,023,043 | 5/1977 | Stevenson | 307/38 |
| 4,152,605 | 5/1979 | Conde et al. | 307/3 |

FOREIGN PATENT DOCUMENTS 2404234 8/1975 Fed. Rep. of Germany .
1147621 11/1957 France .
2147841 3/1973 France .

Primary Examiner—A. D. Pellinen
Assistant Examiner—James L. Dwyer
Attorney, Agent, or Firm—Young & Thompson

[57] ABSTRACT

The present invention relates to unloading relays mounted in modulation circuits of the allocated power by modification by telecontrol of the tripping threshold of the breaker. A preceding signal or the telecontrol signal of the level of the breaker detects, by a modified contactor 15, the assigned power (by the relay 12) of the unloading relay 16. The invention permits adapting unloading relays to modulation networks of the allocated power.

5 Claims, 3 Drawing Figures

UNBALLASTING RELAYS

Several types of apparatus known as unballasting relays are known which are electrical apparatus permitting the selection in an installation of apparatus have priority. This apparatus has for its object, when the predetermined maximum intensity tends to be surpassed, to interrupt the feed of non-priority apparatus so as to avoid either a penalty for over-usage, or interruption by power failure.

It is known to provide apparatus selecting the order of cutting out apparatus as a function of an order or priority, this apparatus being generally based on a microprocessor which controls the order of opening the feed circuits of the various apparatus. So-called multi-threshold apparatus has also been proposed which are based like circuit breakers on a regulable shunting bridge but whose regulation is effected once for all.

It has also been proposed in French Pat. No. 79 21897 of Aug. 31, 1979 to modulate, by teleregulation of the threshold of the circuit breaker, the power available to the user. This manner of use of the network requires therefor a modification of the reference power which determines the operation of the unballasting relay.

The present invention accordingly has for its object a process for using an electrical network by modulation of the voltage by teleregulation of opening threshold of the circuit breakers characterized in that one sends a signal associated with the control signal for modification of the opening threshold of the breaker, to modify the control power or operating threshold of the associated unloading relay. This signal should be different from the control signal for modifying the opening threshold of the breaker but, by virtue of the reaction time of the power detectors, the same signal can control the modification of the operating levels of the two apparatuses.

In the above method, the unloading relay cuts out the non-priority apparatus to reduce the power consumption within the limit of power which is the so-called control power which will be the new power allocated after modification of the control threshold of the breaker.

The present invention also has for its object an unloading relay characterized in that it comprises a control signal detector which modifies the operating threshold of the consumed power detector of the unloading relay.

The modification of operating threshold may be effected either by opening a calibrated shunt disposed in parallel with the power detector, or by opening a short-circuiting shunt, among one of a plurality of power detectors, those whose operating threshold is lower than the authorized power, or by commutation of control circuits between the power detectors and the breakers controlling the feed circuits of the different groups of apparatus.

According to a particular embodiment, the telecontrol device and the power detector or detectors are in common with the breaker and with the unloading relay, a delay being introduced in the operation of the breaker.

According to another characteristic, the exceeding of the control power for the lowest allocated power is predetected during operation at the maximum allocated power for unloading, beginning with the reception of the modification signal for the allocated power.

Other characteristics of the present invention will appear from a consideration of the description of various embodiments given merely by way of example, the description being given with reference to the annexed drawings in which.

Figure 1:
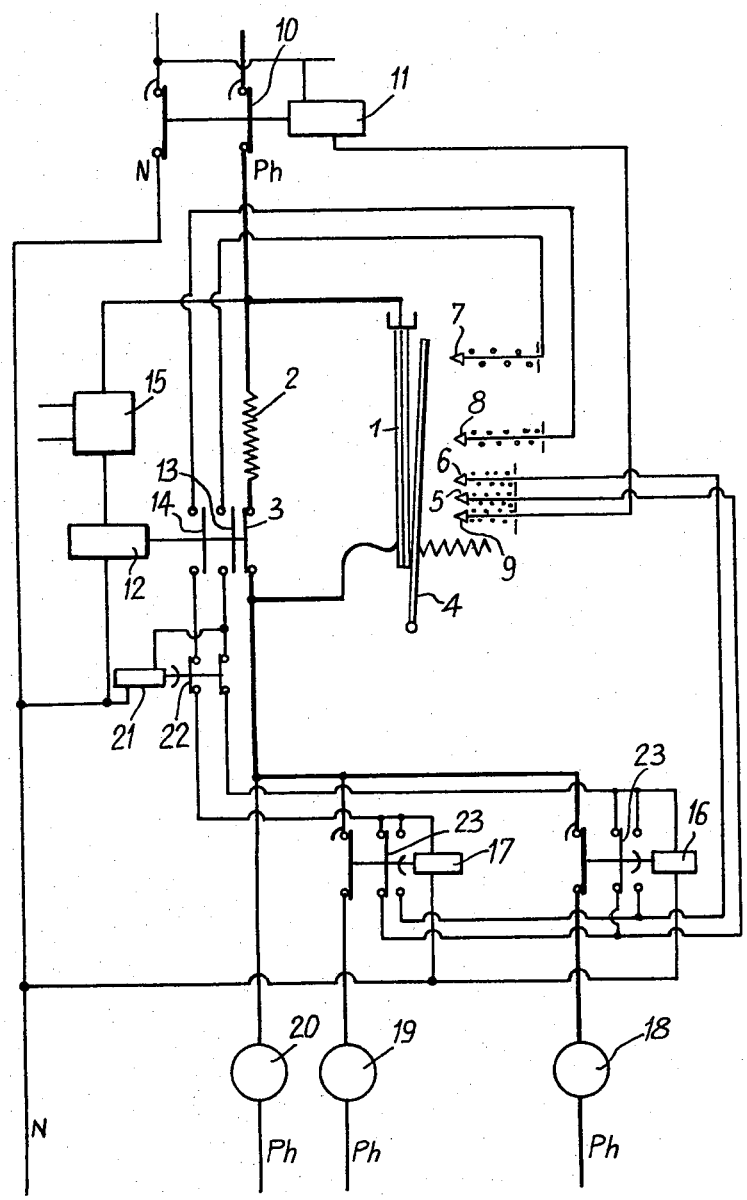
FIG. 1 is a schematic diagram of an unloading relay opening a calibrated shunt.

The unloading relay of FIG. 1 comprises a power detector constituted by a bimetal 1, this bimetal being shunted by a resistance 2 which may be a parallel resistance bridge. In series with resistance 2 is mounted normally closed armature 3 of the telecontrol relay. The value of the shunt is such that the relationship between the resistance of the bimetal and of the shunt in parallel and the resistance of the bimetal alone corresponds to the relationship between the control power of unloading during an emergency period (minimum power) and that in a normal period (prescribed power). The deformation of the bimetal will accordingly be a function of the relationship of the power consumed to the control power when the armature 3 is open and a function of the fraction of this relationship when the armature is closed, this fraction being equal to the resistance relationship of the bimetal and the shunt in parallel to the resistance of the bimetal.

The deformation of the bimetal is effected by an oscillating blade 4 which amplifies its deformations and which cooperates with resilient contacts 5, 6, 7, 8 and 9 that are regulable in position in the present case. The contact 5 is closed when the control power is exceeded. The contact 6 is a re-engagement contact when the consumed power falls again to a fraction again permitting the resetting in circuit of the consuming devices that were thrown out when the relay unloaded, according to the control power. The contact 7 corresponds to the deformation of the bimetal in the case in which the consumed power exceeds the minimum control power although the unloading relay operates at the maximum unloading control power and the contact 8 corresponds to the deformation of the bimetal in the case in which the power consumed corresponds to the value for closing contact 7 increased by the nominal power of the non-priority consuming apparatuses and the contact 9 is a supplemental contact closed when the voltage exceeds by several percent that closing the contact 5 and comprising a control contact for the release of the breaker. By way of example, that there be a prescribed power of 9 kw reduced to 3 kw during an emergency, the priority apparatuses having a nominal power of 2 kw, the apparatuses of second priority a nominal power of 8 kw and the non-priority apparatuses having a nominal power of 4 kw. The contact 5 will close at 9 kw or 3 kw through the bimetal and the contact 6 will close at, for example, 2 kw 6 through the bimetal or 8 kw of consumed power for the maximum control power, the contact 7 will be closed, as a function of the maximum control power, at 3 kw or 1 kw through the bimetal and the contact 8 for 3+4=7 kw.

In fact, if the maximum control power exceeds a minimum control power while the consumed power through the bimetal is 1 kw corresponding to a consumed power of 3 kw, the non-priority apparatuses will be cutout immediately to prevent the bimetal of the breaker which now passes all of the current instead of a third of the current, will not become heated and move by inertia beyond the disengaging point of the breaker. This breaking will cause the consumed power to fall but to the maximum 4 kw, which is the power of the non-priority apparatuses. If it is greater than 7 kw, the situation detected by contact 8, it will also be necessary to cutout the apparatuses of second priority. From this moment, the unloading relay can operate normally with the unloading contact 5 which, when it is established, cuts out the non-priority apparatuses or the apparatuses of second priority if the non-priority apparatuses already have been cutout and the contact 6 which, when it is broken, re-actuates the apparatuses of second priority or the non-priority apparatuses if the apparatuses of second priority have already been cutout.

There will now be described an example of electromagnetic circuit controlled by this detector of consumed power in the form of an unloading relay, it being understood that the relays and breakers described may be replaced by equivalent electronic means. The detector itself may be comprised by an electronic device, but mechanical contacts or plug-in connections whose position may be adjusted are more convenient for such adjustment.

The electromagnetic circuit comprises a breaker 10 whose opening coil 11 is controlled by contact 9 and a telecontrol relay 12 which comprises, in addition to the armature 3 which opens the shunt comprising resistance 2, two armatures 13 and 14 of which one contact is connected to contacts 7 and 8, respectively, these armatures closing their contacts when the relay is actuated. This telecontrol relay is fed by a telecontrol contactor 15 of known type. The second contact of armatures 13 and 14 is connected to the winding of breakers 16 and 17, respectively, these breakers controlling respectively the feeding of the non-priority apparatuses 18 and second priority apparatuses 19, the priority apparatuses 20 being fed directly.

Relay 16 is a delayed closing relay and relay 17 is a delayed opening relay, this delay being of the order of several seconds and determined according to the inertia of the power detector 1 as will be explained hereinafter. In the circuits between the armatures 13 and 14 and the windings of relays 16 and 17 are connected armatures 22 of delayed opening relay 21, the duration of this delay corresponding to the delay necessary for the power detector 1 to reach its equilibrium position after opening the shunt. This relay is fed by contact 7 because it need only intervene if at least this contact is closed. These relays 16 and 17 are self-fed by the contact 6 and their armature 23 in open position and they are fed by closing of the contact 5 by their armature 23 in closing position.

The operation of the unloading relay associated with a power limiting breaker, the two apparatuses being telecontrolled, will be explained hereinafter. The telecontrollable contactor 15 being open, the relays are in the illustrated position. Armatures 3 being closed and as described above, only a third of the current passes through the bimetal 1. With the values given above, when consumption reaches 3 kw (1 kw in the bimetal) contact 7 closes, but armature 13 being open, this closing is without result. The same is true for 7 kw at which the contact 8 closes (2 kw 7 in the bimetal). If consumption reaches 8 kw, contact 6 closes but the circuit ends at the open contacts of armature 23 of relays 16 and 17. For 9 kw the contact 5 is closed and feeds relays 16 and 17. Relay 17 being of the delayed opening type, relay 16 first opens and cuts out non-priority apparatuses 18. Reduction of consumed power may reverse the displacement of detector 1 after a delay due to the heat inertia which is less than the delay of relay 17. In the contrary case, relay 17 opens as well and cuts out the second priority apparatuses. If consumption by the priority circuit remains too great, contact 9 closes and breaker 10 trips. If on the contrary consumption falls again below 8 kw, contact 6 which maintained self-excited the relays 16 and 17 opens, which discontinues the feed of these relays. Relay 17 closes again and if overall consumption remains less than 8 kw, relay 16 also closes with a delay which takes account of the inertia of the power detector to react to the consumption of apparatuses 19 after the closing of relay 17.

If during operation and at any moment the telecontrol contactor closes, relay 12 is fed, it opens its armature 3 and closes its armatures 13 and 14. The total consumption passes through bimetal 1. There are three possibilites at this time. The instantaneous consumption at the moment of commutation was greater than 7 kw and the contacts 7 and 8 were closed; the closing of the armatures 13 and 14 will open the relay 16 and then, after a delay, the relay 17 unless the opening of relay 16 has produced a sufficient reaction in the charge. The instantaneous consumption at the moment of consumption was comprised between 3 and 7 kw and the contact 7 was closed, the closing of the relay 12 will effect the closing of a single relay 16 and the cutting out of non-priority apparatuses 18. In either case, the relay 21 will open with a certain delay which is fixed so as to be sufficient to permit bimetal 1 to deform so that the contact will be established with contact 6, which will take place if the overall consumption is greater than 2 kw 6. If it is less than 2 kw 6, relay 21 being open, the unfed relay recloses, which permits a rise in consumption by the devices of second priority 19, but if consumption then becomes greater than 3 kw, closed contact 5 reopens the relay 17. If overall consumption of the priority apparatuses and second priority apparatuses 19 and 20 is less than 2 kw 6 during the delay in closing of relay 16, the latter recloses and permits feeding the non-priority apparatuses 18. If the overall consumption of the priority apparatuses 20 exceeds 3 kw, contact 9 is closed and breaker 11 trips. A particular case can be considered in which the closing of contact 7 and of contact 8 which were not originally closed for example if, with the above values, the consumption was 2 kw 5. In this case, the apparatuses 18 and 19 will be cutout during a period necessary for the opening of relay 21. This can be corrected by a supplemental relay mounted swingably with the relay 21, this relay opening, as a function of relay 12, armatures in series with armatures 13 and 14, if the relay 21 is not fed. This known device has not been shown so as to keep the drawing simple.

Figure 2:
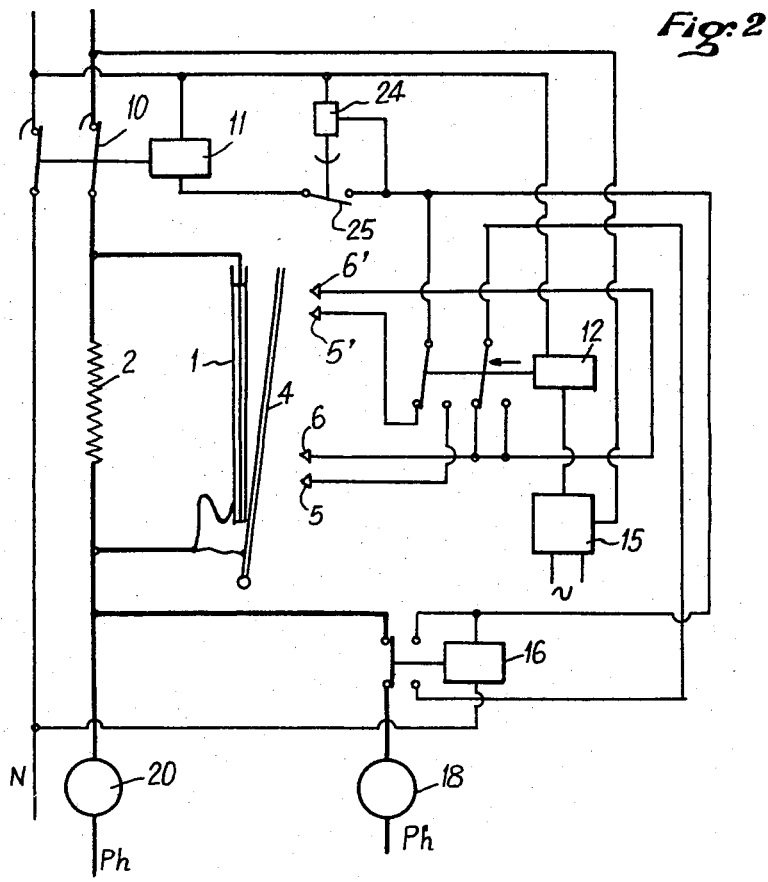
FIG. 2 is a schematic diagram of an unloading relay for commutation of the control circuits of the circuit breakers and unloading and FIG. 3 is a schematic diagram of an unloading relay with commutation between two power detectors.

An unloading relay with power breaker of tele-regulable threshold which has the advantage of not including a cutting out of the shunt of the power detector is shown in FIG. 2. For simplicity, the second priority apparatuses have not been shown but only the priority apparatuses 20 and non-priority apparatuses 18. In this embodiment the same or equivalent elements are designated by the same references. The important difference is that there are two sets of contacts 5, 6–5′, 6′ the first of which correspond to the detection of 9 and 8 kw and the second, for example, 3 and 2.6 kw, these values obviously being capable of modification by regulation of the position of the contacts, by modification of the value of the resistance of shunt 2, etc. Relay 12 is of the swinging type which selects the actuation either of the contacts 5 and 6 when the allotted power is the predetermined maximum power, while contacts 5', 6' when the allotted power is the emergency power. Relay 24 is a delayed opening relay whose armature closes the feed circuit of the actuator of breaker 10.

The operation will be apparent from the above description with reference to FIG. 1. When the contact 5 or 5' which is in circuit closes for a consumption exceeding 9 or 3 kw, relays 16 and 24 are excited, relay 16 cuts out the non-priority apparatuses 18 and ensures its self-excitation by the contact 6 or 6'. If the overload subsides after the delay of relay 24, the latter closes its contact which trips breaker 10.

Figure 3:
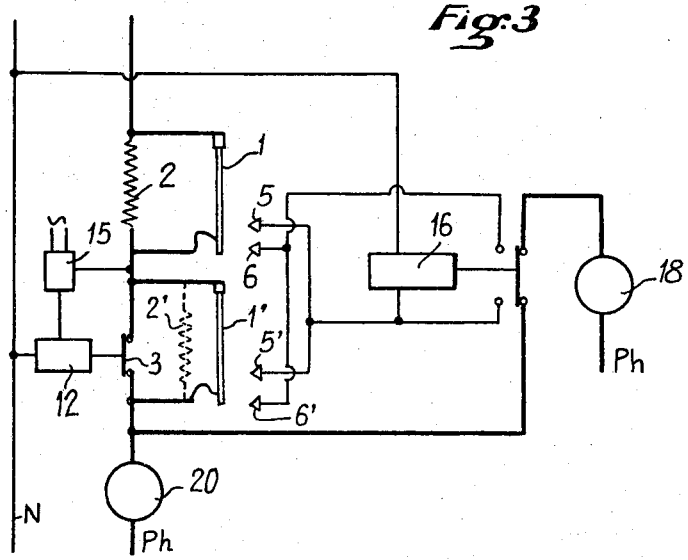

In the embodiment of FIG. 3, the same elements are designated by the same reference numerals, but the breaker 11 is not shown which may be fed by the common point of contacts 5 and 5'. Two detectors 1 and 1' are mounted in series and cooperate with contacts 5, 6 and 5', 6', respectively. Detector 1 is shunted by resistance 2 which may be adjustable to regulate its operating threshold. Detector 1' which may be shunted by a resistance 2' which is also adjustable, is shunted by armature 3 of relay 12 controlled by telecontrollable contactor 15. Armature 3 has very low resistance such that the current travels preferably through this armature, the detector 1' passing no current or very low current. On the contrary, detector 1 passes a fraction of the consumed current and in case the consigned power is exceeded, the unloading is controlled by contacts 5 and 6. If armature 3 is open and resistance 2' higher than resistance 2, the current which passes the detector 1' is greater than that which passes detector 1 and corresponds to the sum of consumed current if 2' does not exist. Therefore 1' will be the active detector which, for 3 kw with the above values, will ensure contact with 5' and unloading of the non-priority apparatuses.

The embodiments described above by way of example are susceptible of numerous modifications, particularly by substitution of electronic equivalents, without departing from the scope of the appended claims.

What is claimed is:

1. A process for using an electrical network provided with a modification of the power available to the user by telecontrol through a control signal emitted in the network to control the modification of the threshold of the tripping of circuit breakers, comprising emitting a signal in the network substantially simultaneously with the control signal for modification of the threshold of tripping the circuit breakers, to modify the control power, or operating level of the associated unloading relay.

2. A process of using an electrical network according to claim 1, in which said signal to modify the control power of the unloading relay is different from the control signal which control the modification of the threshold of tripping the circuit breakers and is emitted prior to the latter.

3. An unloading relay having a power detector, comprising a control signal detector which detects a control signal emitted in a network, and means controlled by said signal detector to modify the operating threshold of the power detector of the unloading relay.

4. An unloading relay according to claim 3, in which the control signal detector opens upon detection of the control signal a calibrated shunt mounted in parallel with the power detector of the unloading relay.

5. An electrical network comprising a circuit breaker, a first control signal detector which detects a first control signal emitted in the network, means controlled by said signal detector to modify the tripping threshold of the circuit breaker by an unloading relay comprising a power detector downside of a circuit-breaker and by a second control signal detector which detects a second control signal emitted in the network, and means controlled by said second signal detector to modify the operating threshold of the power detector of the unloading relay.

* * * * *